United States Patent [19]

Haynes et al.

[11] Patent Number: 4,931,220
[45] Date of Patent: Jun. 5, 1990

[54] ORGANIC PHOTOCHROMIC PIGMENT PARTICULATES

[75] Inventors: Ronald L. Haynes, Barberton; Charles H. Hoelscher, Doylestown; Jonathan G. Lasch, Akron, all of Ohio

[73] Assignee: PPG Industries, Inc., Pittsburgh, Pa.

[21] Appl. No.: 124,718

[22] Filed: Nov. 24, 1987

[51] Int. Cl.$^5$ ................................. G02B 5/23
[52] U.S. Cl. ................................. 252/586; 524/83; 524/84; 524/89; 524/90; 524/92; 524/94; 524/95; 524/98; 524/715; 524/719; 524/742; 524/754
[58] Field of Search ............... 252/586, 582; 524/83, 524/84, 89, 90, 92, 94, 95, 98, 715, 719, 742, 754

[56] References Cited

U.S. PATENT DOCUMENTS

| | | | |
|---|---|---|---|
| 2,809,954 | 10/1957 | Kazenas | 525/515 |
| 2,851,424 | 9/1958 | Switzer | 252/301.2 |
| 3,100,778 | 8/1963 | Berman | 548/409 |
| 3,212,898 | 10/1965 | Cerreta | 430/345 |
| 3,216,958 | 11/1965 | Sheld | 524/270 |
| 3,346,385 | 10/1967 | Foris | 430/275 |
| 3,361,706 | 1/1968 | Smith et al. | 106/163.1 |
| 3,412,034 | 11/1968 | McIntosh et al. | 252/301.2 |
| 3,412,035 | 11/1968 | McIntosh et al. | 252/301.2 |
| 3,562,172 | 2/1971 | Ono et al. | 252/600 |
| 3,565,814 | 2/1971 | Pellon | 252/586 |
| 3,578,602 | 5/1971 | Ono et al. | 252/600 |
| 4,012,232 | 3/1977 | Uhlmann et al. | 106/429 |
| 4,016,133 | 4/1977 | Hyosu | 524/719 |
| 4,132,561 | 1/1979 | Burke, Jr. | 524/719 |
| 4,215,010 | 7/1980 | Hovey et al. | 252/586 |
| 4,220,708 | 9/1980 | Heller | 430/336 |
| 4,342,668 | 8/1982 | Hovey et al. | 252/586 |
| 4,405,733 | 9/1983 | Williams et al. | 524/87 |
| 4,503,177 | 3/1985 | Reid | 524/87 |
| 4,637,698 | 1/1987 | Kwak et al. | 351/163 |

FOREIGN PATENT DOCUMENTS

| | | |
|---|---|---|
| 171909 | 2/1986 | European Pat. Off. . |
| 227337 | 7/1987 | European Pat. Off. . |
| 2906193 | 8/1980 | Fed. Rep. of Germany . |
| 3220257 | 12/1983 | Fed. Rep. of Germany . |
| 3320077 | 12/1984 | Fed. Rep. of Germany . |
| 62-11743 | 1/1987 | Japan . |
| 1418089 | 12/1975 | United Kingdom . |
| 2170202 | 7/1986 | United Kingdom . |
| 2179174 | 2/1987 | United Kingdom . |

Primary Examiner—Mary C. Lee
Assistant Examiner—Catherine S. Kilby Scalzo
Attorney, Agent, or Firm—Irwin M. Stein

[57] ABSTRACT

Described is photochromic particulate material comprising a photochromic substance within a matrix of a polymerizate of a polyfunctional acrylate monomer. The photochromic particulate material may be produced by adding an organic photochromic substance to a polymerizable composition including a polyfunctional acrylate monomer and polymerizing the resultant admixture, e.g., by emulsion polymerization. In the case of emulsion or suspension polymerization, finely divided particulate organic photochromic materials are separated from the polymerization medium in the form of spheroidal thermoset photochromic particles of fairly uniform size. If desired, the particles recovered from the polymerization medium may be further ground in conventional attrition mills to further reduce the size of the particulate product. In the case of bulk polymerization, the polymerizate may be formed as a continuously cast sheet, which is then pulverized to a particulate material of pigmentary size.

16 Claims, No Drawings

ORGANIC PHOTOCHROMIC PIGMENT PARTICULATES

DESCRIPTION OF THE INVENTION

The present invention relates to novel organic photochromic materials, to methods for preparing such materials and to compositions and articles containing same. The terms "photochromic substance" or "photochromic material", as used herein, is intended to mean and include a substance, material, compound or composition which changes its optical transmission or reflectance when subjected to ultraviolet or visible light and which subsequently reverts to its original color or hue upon removal of that light source. A photochromic article is an article containing a photochromic substance or material.

Photochromic compounds, such as spiro(indoline) benzopyrans, spiro(indoline) naphthoxazines and spiro-(indoline) pyridobenzoxazines are known in the art. See, for example, U.S. Pat. Nos. 4,342,668 and 4,637,698. By and large, the methods used for incorporating such photochromic compounds within an organic plastic host has involved incorporating the photochromic compound into the already polymerized host. This is so because polymerization of monomer compositions producing the polymeric host generally requires use of initiators of the peroxide or peroxy ester type. Such initiators are oxidizing agents and are believed to nullify the photochromic behavior of the photochromic compound, probably by oxidation of a portion of the photochromic compound's structure.

Methods used to incorporate photochromic compounds into an organic plastic host include surface dyeing, dissolving the optically transparent resin and photochromic compound in a mutual solvent and using the solution to coat a previously shaped article, e.g., a lens, plate, sheet, film or fiber; dissolving the photochromic compound into a liquid optically transparent resin and casting the resin in the form of a film or sheet, and by imbibition, i.e., by diffusion of the photochromic compound into the preformed plastic host material by a suitable transfer mechanism such as thermal or vapor phase transfer. See, for example, U.S. Pat. Nos. 3,216,958 and 4,637,698, and European Patent Application No. 171,909.

U.S. Pat. No. 3,565,814 suggests that benzospiropyran compounds may be incorporated into a lauryl methacrylate polymer by incorporating the benzospiropyran into lauryl methacrylate monomer and polymerizing the monomer with peroxy-type initiators. Recently there has been proposed a direct casting process for manufacturing a shaped synthetic plastic article having photochromic properties by incorporating a photochromic spiro-oxazine compound into a mixture containing a highly reactive polyfunctional monomer and a low level of a polymerization catalyst, and casting the resultant composition in a mold to form the shaped synthetic plastic article. See European Patent Application No.227,337. It has also been suggested in U.S. Pat. No. 4,012,232 that crystals of photochromic compounds be coated with inorganic oxides to place a protective coating of the inorganic oxide around the crystal. Such coated crystals may be dispersed in polymerizable monomers and the resultant mixture polymerized.

It has now been discovered the the property of photochromism can be extended to many different applications and monomer systems by use of the organic photochromic pigments of the present invention. More particularly, it has been discovered that an organic photochromic substance, such as spiro(indoline)-type compounds, may be incorporated into thermoset materials and a particulate form of that material used in any application where pigmentary materials are used. In accordance with the present invention, an organic photochromic substance or composition is admixed uniformly with a polymerizable monomeric composition including a polyfunctional acrylate monomer and the resulting mixture polymerized, e.g., by emulsion polymerization, to produce finely-divided thermoset photochromic material having the photochromic substance or composition substantially uniformly dispersed throughout the product, e.g., the finely divided particles prepared by emulsion polymerization.

DETAILED DESCRIPTION OF THE INVENTION

Polyfunctional acrylate monomers that may be used to prepare the thermoset photochromic particles described herein are esterification products of an acrylic acid moiety selected from the group consisting of acrylic acid and methacrylic acid, and a polyol, e.g., a diol, a triol or tetracarbinol. More particularly, the polyfunctional acrylate monomer may be represented by the following graphic formula I:

$$(CH_2=C(R)-C(O))_{\overline{n}}R' \quad \text{I}$$

wherein R is hydrogen or methyl, n is the number 2, 3, or 4, and R' is the multivalent radical, i.e., a bivalent, trivalent or quadravalent radical, remaining after removal of the hydroxy groups from a polyol, having from 2 to 4 hydroxy groups, e.g., a diol, triol or tetracarbinol respectively. More particularly, R is hydrogen or methyl, and n is 2 or 3, more usually 2.

R' may be selected from the group consisting of alpha, omega $C_2$-$C_8$ glycols, cyclohexane diol, diethylene glycol, triethylene glycol, tetraethylene glycol, dipropylene glycol, $C_2$-$C_5$ triols and pentaerythritol. Examples of such polyols include ethylene glycol, trimethylene glycol, 1,4-butane diol, 1,5-pentane diol, 1,6-hexane diol, propylene glycol, trimethylol propane, glycerol and the like.

Examples of polyfunctional acrylate monomers, such as diacrylates and triacrylates, include: ethylene glycol diacrylate, ethylene glycol dimethacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5-pentane diol diacrylate, 2,5-dimethyl-1,6-hexane diol dimethacrylate, diethylene glycol diacrylate, diethylene glycol dimethacrylate, triethylene glycol dimethacrylate, trimethylol propane trimethacrylate, tetraethylene glycol diacrylate, tetraethylene glycol dimethacrylate, dipropylene glycol diacrylate, dipropylene glycol dimethacrylate, trimethylol propane triacrylate, glycerol triacrylate, glycerol trimethacrylate, pentaerythritol triacrylate, pentaerythritol dimethacrylate, pentaerythritol tetraacrylate, pentaerythritol tetramethacrylate and mixtures of such acrylate monomers.

A portion of the polyfunctional acrylate monomer may be replaced with a monofunctional copolymerizable monomer containing the vinyl ($CH_2=CH-$) grouping. Such compatible monomers include monofunctional acrylic and methacrylic acid esters, and vinyl esters of $C_2$-$C_6$ carboxylic acids, i.e., vinyl carboxylates. Preferably, the copolymerizable monomer is a non-aromatic, e.g., non-benzenoid, containing monomer. Monofunctional acrylic or methacrylic ester monomers may be graphically illustrated by the following formula,

$$CH_2=C(R)-C(O)-O-R'' \qquad \text{II}$$

wherein R is hydrogen or methyl, and R' is selected from the group consisting of $C_1$-$C_{12}$, e.g., $C_1$-$C_8$, alkyl, $C_5$-$C_6$ cycloalkyl, glycidyl and hydroxyethyl. Preferably, R'' is a $C_1$-$C_4$ alkyl, e.g., methyl, or cyclohexyl.

Examples of monofunctional acrylic acid type monomers include, for example, the acrylic and methacrylic acid esters of alkanols such as methanol, ethanol, propanol, butanol, pentanol, hexanol, heptanol and octanol, e.g., methyl acrylate, methyl methacrylate, ethyl acrylate and ethyl methacrylate, cycloalkanols such as cyclopentanol and cyclohexanol, glycidol (3-hydroxy propylene oxide, (d, 1, dl)) and ethylene glycol. Examples of vinyl carboxylates include vinyl acetate, vinyl propionate, vinyl butyrate and vinyl valerate. In addition to and/or in place of the aforedescribed monofunctional copolymerizable monomer, monofunctional allylic and difunctional allylic copolymerizable compatible monomers may also replace a portion of the polyfunctional acrylate monomer. Monofunctional allylic monomers contemplated include allyl esters of $C_2$-$C_6$ carboxylic acids, $C_1$-$C_6$ allyl ethers and other copolymerizable allyl compounds. Preferably the monofunctional allylic monomer is a non-aromatic compound.

Difunctional allylic copolymerizable monomers contemplated herein are polyol (allyl carbonates) such as the allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113.

The polyol (allyl carbonate) monomers can be represented by the graphic formula:

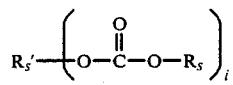

wherein $R_s$ is the radical derived from an allyl or substituted allyl group, $R_s'$ is the radical derived from the polyol, and i is a whole number from 2-5, preferably 2. The allyl group ($R_s$) can be substituted at the 2 position with a halogen, most notably chlorine or bromine, or an alkyl group containing from 1 to 4 carbon atoms, generally a methyl or ethyl group. The $R_s$ group can be represented by the graphic formula:

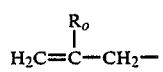

wherein $R_o$ is hydrogen, halogen, or a $C_1$-$C_4$ alkyl group. Specific examples of $R_s$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly $R_s$ is the allyl group, $H_2C=CH-CH_2-$.

$R_s'$ is a polyvalent radical derived from the polyol, which can be an aliphatic or aromatic polyol that contains 2, 3, 4 or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$-$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

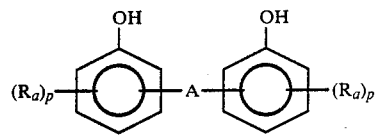

wherein A is a bivalent radical derived from an acyclic aliphatic hydrocarbon, e.g., an alkylene or alkylidene radical, having from 1 to 4 carbon atoms, e.g., methylene, ethylene, and dimethylmethylene (isopropylidene:), Ra represents lower alkyl substituents of from 1 to 3 carbon atoms, and p is 0, 1, 2, or 3. Preferably, the hydroxyl group is in the ortho or para position.

Specific examples of the radical $R_s'$ include: alkylene groups containing from 2 to 10 carbon atoms such as ethylene, ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2-CH_2-$, $-CH_2-O-CH_2-CH_2-$, and $-CH_2CH_2-CH_2-O-CH_2CH_2CH_2-$; alkylene polyether groups such as $-CH_2CH_2-O-CH_2CH_2-O-CH_2CH_2-$, and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2CH_2-O-CH_2CH_2-$; and isopropylidene bis(para-phenyl), i.e., 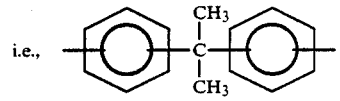

Most commonly, $R_s'$ is $-CH_2CH_2-$, $-CH_2CH_2-O-CH_2CH_2-$, or $-CH_2CH_2-O-CH_2CH_2-O-CH_2Ch_2-$.

Specific examples of polyol (allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate).

In addition, a partially polymerized form of the polyol (allyl carbonate) monomer can be used. In that embodiment, the monomer is thickened by heating or partially polymerized by using small, e.g., 0.5–1.5 parts of initiator per hundred parts of monomer (phm), to provide a non-gel containing, more viscous monomeric material.

As used in the present description and claims, the term polyol(allyl carbonate) monomer or like names, e.g., diethylene glycol bis(allyl carbonate), are intended to mean and include the named monomer or prepolymer and any related monomer species contained therein.

The amount of polyfunctional acrylate monomer that may be replaced with copolymerizable (monofunctional and/or difunctional vinylic or allylic) monomer is generally less than 50, e.g., less than 20 weight percent. Such amounts may vary from about 1 to about 20 weight percent. Thus, the polyfunctional acrylate monomer composition may contain from about 0 to about 20 weight percent of copolymerizable monomer.

The polymer product (resin) resulting from polymerization of the polyfunctional acrylate monomer composition is a thermoset material. As used herein the term polyfunctional acrylate monomer composition is intended to mean and include a polymerizable composition containing polyfunctional acrylate monomer alone or together with components selected from the group consisting of copolymerizable compatible monomer (monofunctional and/or difunctional) and adjuvants such as ultraviolet light absorbers, antioxidents, stabilizers, etc. By "thermoset" is meant that upon complete polymerization of the monomer composition, the resulting resin is infusible and substantially insoluble in nearly all solvents. Further application of heat, short of that which will char or disintegrate the resin, will produce no appreciable changes therein. The thermoset resin should be relatively brittle to allow it to be ground into finely divided particles, but the resin has a high degree of physical and chemical integrity, i.e., it is resistant to the action of common bases, acids and detergents, and is soluble in common organic solvents. The polyfunctional acrylate monomer(s) and copolymerizable monomer (if used) are selected so that the resultant polymerizate is highly cross-linked and, therefore, relatively brittle, i.e., it can be ground or milled readily to reduce its size to a pigmentary size range (as described herein) using conventional attrition milling devices, e.g., ball mills.

The polymer product will usually be transparent, but may be translucent or even opaque. The polymer product need only be transparent to that portion of the electromagnetic spectrum, which activates the photochromic compound, i.e., that wavelength of ultraviolet light that produces the open form of the compound and that portion of the visible spectrum that includes the absorption maxima wavelength of the compound in its UV activated form, i.e., the open form. Further, the resin color should not be such that it masks the color of the activated form of the photochromic compound, i.e., so the change in color is readily apparent to the observer.

Polymerization of the polyfunctional acrylate monomer composition may be performed using conventional polymerization techniques that are used for acrylate-type monomers. The polymerization may be performed in bulk or by a suspension or emulsion process. A considerable body of literature concerned with the polymerization of acrylic ester monomers has been developed and such literature may be used to perform the polymerizations described herein. The exact polymerization process used will be governed by the physical form of the particulate photochromic material desired and by the photochromic substance which is to be incorporated into such particulate product. For example, a polymerization process should be used which does not utilize procedures or materials that will interfere with the photochromic substance and thereby nullify the reversible color changeability of that substance, i.e., if a particular polymerization process requires the use of ingredients to which the photochromic substance is sensitive, then a different process should be utilized. The same is true of polymerization processes requiring conditions of high temperature, solvent, catalyst, etc.

Bulk polymerization may be used to continuously cast sheets of the polymer product or to produce sheets in molds by a batch process. Such sheets may be granulated and then ground into particles of the desired size. The bulk polymerization process is difficult to control due to the need remove heat from the polymerization media and is, therefore, not the preferred polymerization process to be used.

In suspension polymerization, the monomer composition is suspended in water as 0.1 to about 5 millimeter (mm) droplets, which are stabilized by protective colloids or suspending agents. Polymerization is initiated by a monomer-soluble initiator and takes place within the monomer droplets. The suspending medium, i.e., water, serves as both the dispersing medium and as a heat transfer agent. Particle size is controlled primarily by the rate of agitation and the concentration and type of suspending aids utilized. The polymer product is obtained as small beads of about 0.1 to about 5 mm in diameter, which may be isolated by filtration or centrifugation.

Suitable protective colloids used in suspension polymerization include cellulose derivatives, polyacrylate salts, starch, poly(vinyl alcohol), gelatin, talc, clay and clay derivatives. These ingredients prevent the monomer droplets from coalescing during polymerization.

Initiators that may be used for bulk or suspension polymerization of acrylate monomers include peroxides, hydroperoxides, peresters, percarbonates, and azo-type catalysts. Examples of such initiators include methyl ethyl ketone peroxide, benzoyl peroxide, cumene hydroperoxide, tertiarybutyl peroctoate, diisopropyl peroxydicarbonate, dicyclohexyl peroxydicarbonate, tertiarybutylperoxy isopropylcarbonate, lauroyl peroxide and 2,2'-azobisisobutyronitrile.

Emulsion polymerization of the polyfunctional acrylate monomer composition provides a convenient method for the preparation of high solids, low viscosity latices. Emulsion polymerization utilizes a relatively large amount, e.g, 1–5 weight percent, of nonionic or anionic surfactants to emulsify the monomer composition. In an emulsion polymerization, product particle size is controlled by the concentration and type of emulsifier used. Anionic soaps usually produce finer particles. Further, blends of emulsifiers are often used. Sodium lauryl sulfate is a common anionic surfactant that is used for such polymerizations.

Typically, a water soluble initiator or a redox initiator system is used to initiate the emulsion polymerization. Persulfates, such as potassium persulfate, ammonium persulfate or sodium persulfate, or hydrogen peroxide are typically used as the water-soluble initiator. Other initiators that may be used include organic peroxygen compounds such as tertiarybutyl hydroperoxide, cumene hydroperoxide, lauroyl peroxide, benzoyl peroxide and methyl ethyl ketone peroxide. In the case of a redox initiating system, a peroxygen compound such as a persulfate or organic hydroperoxide and a reducing agent such as sodium bisulfite, sodium sulfite, sodium metabisulfate, sodium thiosulfate, sodium hydrosulfite and sodium formaldehyde sulfoxylate are used, often with a small amount of ferrous sulfate activator. Typically, 1 part of the peroxygen compound, 0.1–1.5 parts of the reducing agent and 0.001–0.002 parts of a water soluble metal salt are used, e.g., a persulfate-bisulfite-ferrous sulfate redox initiator system.

In performing an emulsion polymerization, the monomer is emulsified by adding the emulsifier and monomer(s) to deionized water with good agitation. The initiator system is then added to the emulsified monomer and, after a brief induction period, the polymerization reaction begins with a vigorous rise in temperature. Alternatively, the initiator may be added to a reactor containing deionized water and emulsifier, e.g., sodium lauryl sulfate, and thereafter emulsified monomer introduced slowly to the reactor. The polymerized product is cooled to room temperature and recovered by filtration or other suitable solid-liquid separating means.

The particulate thermoset polymeric product useful as the organic photochromic pigment described herein will preferably have an average particle size diameter in the range of between about 0.25 and about 20 micrometers, more particularly, 0.25–5 micrometers, e.g., 1 to 2 micrometers. In some applications, it is preferred that the particle size range between about 0.25 and about 1 micrometer. Such particle sizes may be obtained by controlling the conditions of the suspension and emulsion polymerization process using techniques known in the art, e.g., by regulating the size of dispersed monomer droplets in suspension polymerization and by selecting the amount of surfactant which will yield the desired particle size in emulsion polymerization. In the case of bulk polymerization where the product may be a cast thin sheet, particles of the desired size may be obtained by granulating and grinding the sheet with conventional Pulverizing equipment such as hammer mills, rod mills, ball mills, roller mills, fluid energy mills, micronizers and other type of attrition milling equipment. Particulate product prepared by emulsion or suspension polymerization methods may also be reduced in average particle size, if desired, by utilization of the aforedescribed milling apparatus. This may occur when the polymerization process yields a spheroidal particulate product larger in average particle diameter than desired for a particular application.

Wet milling methods are not recommended as that method may leach the photochromic substance from the particles being ground. Dry milling or grinding is preferred. During dry grinding, it is recommended that the particles be kept relatively cool This may be achieved by providing external cooling to the pulverizing equipment or by periodically halting the milling process to allow the particles to cool. Moreover, rinsing or washing the particles with a solvent such as methanol may extract some of the photochromic substance from the particles.

In preparing the photochromic particulate thermoset materials of the present invention, at least one organic photochromic substance is dissolved or dispersed in the polyfunctional acrylic monomer composition to be polymerized. This may accomplished by physically mixing the monomer composition with the photochromic substance with sufficient agitation to accomplish the dissolution or dispersion with or without mild heating to enhance the rate of dissolution. The amount of photochromic substance(s) incorporated into the monomeric composition may vary and will depend on the photochromic substance's solubility in the monomer composition. Typically, a sufficient amount of the photochromic substance is added to the monomer composition so that the resulting particulate resin (polymerizate) is photochromic, i.e., produces a photochromic effect.

By "photochromic" or "photochromic effect" is meant that when the particlulate resin is exposed to ultraviolet light, the particles visibly change color (or become colored) and then return to their original color or colorless state when the ultraviolet light is removed. The photochromic effect may be readily observed by exposing the particulate resin containing the photochromic substance to a source of ultraviolet light such as the sun or to an artificial ultraviolet light source such as a Spectroline ® lamp, Model ENF-28(365) nanometers.

The amount of photochromic substance(s) incorporated within the particulate resin may vary greatly. The lower limit is that amount which will still provide a photochromic effect, while the upper limit is defined by the solubility of the photochromic substance in the monomer and resulting resin. Generally, the amount of photochromic substance(s) incorporated into the polymerizable polyfunctional acrylate composition or particulate resin may vary from about 0.01 to about 10 weight percent. When the particulate resin is used directly, i.e., without dilution with other non-photochromic resin, the amount of photochromic substance(s) incorporated therein will usually range from about 0.01 to about 2 weight percent, more particularly from about 0.01 to about 1 weight percent, e.g., from about 0.1 or 0.5 to about 1 weight percent.

In another embodiment, it is contemplated that photochromic particulate resin is prepared containing higher amounts of photochromic substance(s), e.g., up to the solubility limit of the photochromic substance(s) in the resin. This resin is used as a concentrate and is subsequently diluted or let down with non-photochromic resin prior to use. In preparing such concentrates, it is contemplated that the amount of photochromic substance(s) in the resin will vary from about 2 to about 10 weight percent, e.g., from about 5 to about 10 weight percent. The greater the amount of photochromic compound incorporated into the particulate resin, the greater the intensity of the color of the particles upon irradiation.

Photochromic substances contemplated for use in preparing the organic photochromic pigment of the present invention are organic substances, including spiro(indoline)-type compounds, that provide a visual photochromic response when incorporated into the particulate resin described hereinabove, that are dispersible, e.g., soluble, within the polyfunctional acrylate monomeric composition and that are chemically compatible with such monomeric composition and the resulting resin polymerizate.

Particularly contemplated photochromic substances include spiro(indoline)-type compounds, such as spiro(indoline) pyridobenzoxazines, spiro(indoline) naphthoxazines, spiro(benzindoline), pyrido benzoxazines, spiro(benzindoline) naphthoxazines, spiro(indoline) benzopyrans, spiro(indoline) naphthopyrans, spiro(indoline) quinopyrans, spiro(indoline) benzoxazines, and metal dithizonate compounds, fulgides or fulgimides, and spiro(di)hydroindolizines. The particular photochromic substance selected for use will depend on its compatibility with the monomeric composition and particulate resin product, including its solubility therein, and the particular change in color exhibited by the photochromic substance when incorporated into the particulate resin product and irradiated with ultraviolet light. Particularly contemplated are the spiro(indoline)-type compounds, such as spiro(indoline) naphthoxazines and spiro(indoline) pyridobenzoxazines.

Spiro(indoline)pyrido benzoxazines contemplated herein may be represented by the following graphic formula:

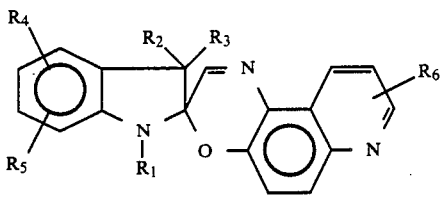

In the above graphic formula III, $R_1$ is selected from the group consisting of $C_1$-$C_8$ alkyl, e.g., methyl, ethyl, propyl, butyl, etc., phenyl, phen($C_1$-$C_4$) alkyl, e.g., benzyl, naphth ($C_1$-$C_4$) alkyl, e.g., 1-naphthylmethyl, allyl, acrylyl, methacrylyl, carboxy ($C_2$-$C_6$) alkyl, e.g., β-carboxyethyl, γ-carboxypropyl and δ-carboxybutyl, cyano ($C_2$-$C_6$) alkyl, e.g., β-cyanoethyl, γ-cyanopropyl, β-cyanoisopropyl, and δ-cyanobutyl, $C_1$-$C_4$ acyloxy ($C_2$-$C_6$) alkyl, i.e., [$R_cC(O)R_d$-, where $R_c$ is a $C_1$-$C_4$ alkyl and $R_d$ is a $C_2$-$C_6$ alkyl], e.g., acetoxyethyl, acetoxypropyl, propionyloxyethyl, acetoxybutyl, and propionyloxypropyl, hydroxy ($C_2$-$C_6$) alkyl, e.g., hydroxyethyl, hydroxypropyl and hydroxybutyl, $(C_2H_4O)_mCH_3$, wherein m is a number from 1 to 6, and mono- and di-substituted phenyl, said phenyl substituents being selected from $C_1$-$C_4$ alkyl and $C_1$-$C_5$ alkoxy, e.g., methoxy, ethoxy, propoxy, butoxy and pentoxy. Preferably, $R_1$ is selected from the group consisting of a $C_1$-$C_4$ alkyl, phenyl, benzyl, 1-naphth ($C_1$-$C_2$) alkyl, carboxy ($C_1$-$C_4$) alkyl, cyano ($C_2$-$C_4$) alkyl, $C_1$-$C_4$ acyloxy ($C_2$-$C_4$) alkyl, e.g., $C_1$-$C_4$-acyloxyethyl, hydroxy ($C_2$-$C_4$) alkyl and $(C_2H_4O)_m.CH_2$, wherein m is a number of from 1 to 3, e.g., 2.

$R_2$ and $R_3$ of formula III are each selected from the group consisting of $C_1$-$C_5$ alkyl, phenyl, mono- and di-substituted phenyl, benzyl or $R_2$ and $R_3$ may combine to form a cyclic ring selected from the group consisting of an alicyclic ring containing from 6 to 8 carbon atoms (including the spiro carbon atom), norbornyl and adamantyl. The aforesaid phenyl substituents may be selected from $C_1$-$C_4$ alkyl and $C_1$-$C_5$ alkoxy radicals. More particularly, $R_2$ and $R_3$ are each selected from $C_1$-$C_5$ alkyl, e.g., methyl, ethyl, propyl, butyl and pentyl, and phenyl. When one of $R_2$ or $R_3$ is a tertiary alkyl radical, such as tertiary butyl or tertiary amyl, the other is preferably an alkyl radical other than a tertiary alkyl radical.

$R_4$ and $R_5$ in graphic formula III are each selected from the group consisting of hydrogen, $C_1$-$C_5$ alkyl, halogen, e.g., chloro and fluoro, $C_1$-$C_5$ alkoxy, nitro, cyano, $C_1$-$C_4$ monohaloalkyl, e.g., chloromethyl, fluoromethyl, chloroethyl, chloropropyl, etc., $C_1$-$C_4$ polyhaloalkyl, e.g., trihaloalkyl, $C_1$-$C_8$ alkoxycarbonyl, and $C_1$-$C_4$ acyloxy, i.e., $R_cC(O)$—, wherein $R_c$ is a $C_1$-$C_4$ alkyl, such as acetoxy. While any halogen, i.e., chlorine, bromine, iodine and fluorine, may be used in respect to the halogen or haloalkyl substituents, chlorine, fluorine and bromine, especially chlorine and fluorine is preferred for the halogen substituent and fluorine is preferred for the polyhaloalkyl substituent, e.g., trifluoromethyl ($CF_3$) Preferably, $R_4$ and $R_5$ are each selected from the group consisting of $C_1$-$C_2$ alkyl, e.g., methyl and ethyl, chlorine, fluorine, $C_1$-$C_2$ trihaloalkyl, e.g., trihalomethyl such as trifluoromethyl, and $C_1$-$C_5$ alkoxy, e.g., methoxy and ethoxy. $R_4$ and $R_5$ may be located on any two of the available carbons atoms of the indolino portion of the compound, i.e., on the 4, 5, 6 or 7 positions. Preferably, when the substituents are other than hydrogen, they are located at the 4 and 5, 5 and 6, 4 and 7 or 6 and 7 positions.

It is possible that the spiro(indoline) pyrido benzoxazines of graphic formula III can be a mixture of isomers due to the alternative directional mechanisms by which intramolecular condensation occurs during formation of the starting indol reactant (Fischer's base). Indolization of 3-substituted phenylhydrazones can give rise to a 4-substituted indole, a 6-substituted indole, or mixtures thereof. When $R_4$ and $R_5$ are both other than hydrogen, substitution on the benz portion of the indolino ring may comprise an isomeric mixture, e.g., a mixture of substituents at the 4 and 5, 4 and 5, 5 and 6, 4 and 7, 5 and 7 and 6 and 7 positions. Commonly, such substituents are located at the 4 and 5 or 5 and 6 positions, and thus there may be an isomeric mixture of such substituents, e.g., 4 (and 6) and 5- substituted compounds.

$R_6$ in graphic formula III may be selected from the group consisting of hydrogen, $C_1$-$C_5$ alkyl, e.g., $C_1$-$C_4$ alkyl, $C_1$-$C_5$ alkoxy, e.g., $C_1$-$C_2$ alkoxy, and halogen, e.g., chloro, fluoro or bromo. Preferably, $R_6$ is hydrogen.

Of particular interest, are spiro(indoline)pyrido benzoxazines represented by graphic formula III wherein $R_1$ is a $C_1$-$C_4$ alkyl, such as methyl, ethyl, n-propyl, isopropyl, n-butyl, secondary butyl, isobutyl and tertiary butyl; $R_2$ and $R_3$ are each methyl, ethyl or phenyl; and $R_4$ and $R_5$ are each methyl, methoxy, trifluoromethyl, chloro or fluoro.

The spiro(indoline)pyrido benzoxazines described above can be synthesized by reaction of the corresponding nitroso-hydroxy quinoline compound with the corresponding free indoline (Fischer's base) or indolium salt, e.g., the iodide salt, compound. The two precursor materials are refluxed in a suitable solvent such as toluene or isopropanol until the reaction is completed. A base, such as triethylamine, is present in the reaction medium when the indolium salt is used as the reactant. See, for example, U.S. Pat. No. 4,637,698, which describes the aforesaid spiro(indoline) pyrido benzoxazines and their synthesis. The aforesaid patent is incorporated herein by reference.

Examples of spiro(indoline)pyrido benzoxazines that may be used in the practice of the present invention include those in Table I wherein $R_1$, $R_2$, $R_3$, $R_4$ and $R_5$ are as listed and $R_6$ is hydrogen.

TABLE I

| Compound | $R_1$ | $R_2$ | $R_3$ | $R_4$ | $R_5$ |
|---|---|---|---|---|---|
| 1 | $CH_3$ | $CH_3$ | $CH_3$ | H | H |
| 2 | $CH_3$ | $CH_3$ | $CH_3$ | $CH_3$ | $CH_3$ |
| 3 | $CH_3$ | $CH_3$ | $CH_3$ | $OCH_3$ | H |
| 4 | $CH_3$ | $CH_3$ | $CH_3$ | Cl | $CH_3$ |
| 5 | $CH_3$ | $CH_3$ | $C_2H_5$ | H | H |
| 6 | $CH_3$ | $CH_3$ | $C_2H_5$ | $CH_3$ | $CH_3$ |

TABLE I-continued

| Compound | R₁ | R₂ | R₃ | R₄ | R₅ |
|---|---|---|---|---|---|
| 7 | CH₃ | C₂H₅ | C₂H₅ | H | H |
| 8 | n-C₄H₉ | CH₃ | C₂H₅ | H | H |
| 9 | CH₃ | CH₃ | phenyl | H | H |
| 10 | CH₃ | phenyl | phenyl | H | H |
| 11 | C₂H₅ | CH₃ | C₂H₅ | CH₃ | CH₃ |
| 12 | n-C₄H₉ | CH₃ | C₂H₅ | CH₃ | CH₃ |

Compound 2 in Table I may be named 1,3,3,4,5-(or 1,3,3,5,6-) pentamethylspiro [indoline-2,3' [3H] pyrido [3,2-f] [1,4] benzoxazine]. Similarly, compound 6 in Table I may be named 1,3,5,6-tetramethyl-3-ethylspiro [indoline-2,3' [3H] pyrido [3,2-f] [1,4] benzoxazine]. Other compounds in Table I can be similarly named taking into account the different substituents.

Spiro(indoline)naphthoxazines contemplated herein may be represented by the following graphic formula:

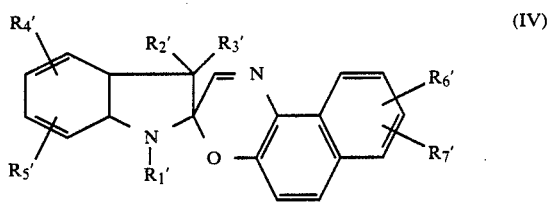
(IV)

Spiro(indoline)naphthoxazines and their synthesis are described in, for example, U.S. Pat. Nos. 3,562,172, 3,578,602 and 4,215,010.

In graphic formula IV, $R_1'$, $R_2'$, $R_3'$, $R_4'$ and $R_5'$ may be selected from those substituents described with respect to $R_1$, $R_2$, $R_3$, $R_4$ and $R_5$ respectively in graphic formula III. $R_6'$ and $R_7'$ may each be selected from those substituents described with respect to $R_6$ in graphic formula III.

Examples of spiro(indoline)naphthoxazines contemplated herein, include those in which the substituents $R_1'$-$R_7'$ are the following:

TABLE II

| Compound | R'₁ | R'₂ | R'₃ | R'₄ | R'₅ | R'₆ | R'₇ |
|---|---|---|---|---|---|---|---|
| 1 | CH₃ | CH₃ | CH₃ | H | H | OCH₃ | H |
| 2 | CH₃ | CH₃ | CH₃ | CH₃ | CH₃ | OCH₃ | H |
| 3 | CH₃ | CH₃ | CH₃ | OCH₃ | H | OCH₃ | H |
| 4 | CH₃ | CH₃ | CH₃ | Cl | CH₃ | OCH₃ | H |
| 5 | CH₃ | CH₃ | C₂H₅ | H | H | OCH₃ | H |
| 6 | CH₃ | CH₃ | C₂H₅ | CH₃ | CH₃ | OCH₃ | H |
| 7 | CH₃ | C₂H₅ | C₂H₅ | H | H | OCH₃ | H |
| 8 | n-C₄H₉ | CH₃ | C₂H₅ | H | H | OCH₃ | H |
| 9 | CH₃ | CH₃ | phenyl | H | H | OCH₃ | H |
| 10 | CH₃ | phenyl | phenyl | H | H | OCH₃ | H |
| 11 | CH₃ | p-C₆H₄OCH₃ | p-C₆H₄OCH₃ | H | H | OCH₃ | H |
| 12 | C₂H₅ | CH₃ | C₂H₅ | CH₃ | CH₃ | OCH₃ | H |
| 13 | n-C₄H₉ | CH₃ | C₂H₅ | CH₃ | CH₃ | OCH₃ | H |

Compound 2 in Table II may be named 1,2,3,3,5,6-pentamethyl-9'-methoxyspiro[indolino-2,3'[3H]naphtho [2,1-b][1,4]-oxazine]. Similarly, compound 6 in Table II may be named 1,3,5,6-tetramethyl-3-ethyl-9'-methoxyspiro [indolino-2,3' [3H]-naphtho [2,1-b][1,4]-oxazine]. Other compounds in Table II can be similarly named taking into account the different substituents.

Spiro(indoline)benzopyrans that are contemplated for use in the present invention include those represented by the following graphic formula:

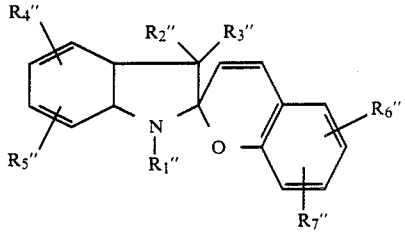
(V)

Spiro(indoline)benzopyrans are known in the art. These benzopyrans and their synthesis are described in U.S. Pat. No. 3,100,778, 3,212,898 and 3,346,385 as well as in the British Pat. No. 1,418,089.

In graphic formula V, $R_1''$, $R_2''$, $R_3''$ $R_4''$, $R_5''$, $R_6''$ and $R_7''$ may be selected from those substituents described with respect to $R_1'$, $R_2'$, $R_3'$, $R_4'$, $R_5'$ $R_6'$ and $R_7'$ respectively in graphic formula IV, i.e., those substituents named with respect to $R_1$-$R_6$ in graphic formula III.

Examples of spiro(indoline)benzopyrans include:
1,3,3-trimethyl-6'-nitro-spiro(2H-1-benzopyran-2,2'-indoline); 1,3,3-trimethyl-6'-nitro-8'-methoxy-spiro(2H-1-benzopyran-2,2'-indoline); 1,3,3-trimethyl-6'-nitro-8'-bromo-spiro(2H-1-benzopyran-2,2'-indoline); 1,3,3-trimethyl-5'-bromo-6'-nitro-8'-methoxy-spiro(2H-1-benzopyran-2,2'-indoline);
1,3,-trimethyl-5-chloro-6'-nitro-spiro(2H-1-benzopyran-2,2'-indoline); and
1-phenyl-3,3-dimethyl-6'-nitro-spir(2H-1-benzopyran-2,2'-indoline).

Spiro(indoline)naphthopyrans and spiro(indoline)quinopyrans may be represented by the following graphic formula VI,

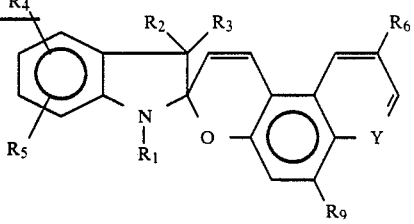
(VI)

wherein $R_1$, $R_2$, $R_3$, $R_4$ and $R_5$ are as described with respect to graphic formula III, $R_6$ and $R_9$ may each be selected from hydrogen, $C_1$-$C_4$ alkyl, $C_1$-$C_4$ alkoxy, nitro, and halogen, e.g., chloro fluoro or bromo, and Y is carbon or nitrogen.

Examples of spiro(indoline)naphthopyrans, include:

1,3,-trimethyl spiro[indoline-2,2'-[2H]-naphtho[1,2-b]pyran];

1,3,3,5,6-pentamethylspiro[indoline-2,2'-[2H]-naphtho[1,2-b] pyran];

1,3,-trimethyl-5-methoxyspiro[indoline-2,2'-[2H]-naphtho[1,2-b] pyran];

1,3,-trimethyl 6'-chlorospiro[indoline-2,2'-[2H]-naphthol[1,2-b]pyran]; and 1,3,3-trimethyl-6'-nitrospiro[indoline-2,2'-[2H]-naphthol[1,2-b]pyran].

Examples of spiro(indoline)quinopyrans include: Spiro[2H-indole-2,3'-3H]pyrano[3,2-f]quinoline; 1,3,3-trimethyl Spiro[2H-indole-2,3'-[3H]pyrano[3H-]pyrano[3,2-f]quinoline; 1,3,3,5,6-pentamethyl Spiro[2H-indole-2,3'-[3H]pyrano[3,2-f]quinoline; 1,3,5,6-tetramethyl-3-ethyl Spiro[2H-indole-2,3'-[3H]pyrano[3,2-f]quinoline; 1,3,3-trimethyl-5-methoxy Spiro[2H-indole-2,3'-[3H]pyrano[3,2-f]quinoline; and 5-chloro-1,3,3,6'-tetramethyl spiro[2H-indole-2,3'-[3H]pyrano]3,2-f]-quinoline.

Spiro(indoline) benzoxazines may be represented by the following graphic formula VII.

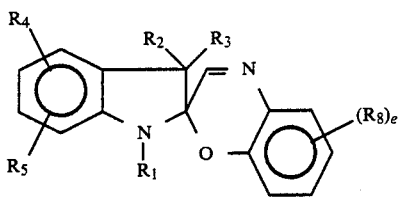

(VII)

wherein $R_1$, $R_2$, $R_3$, $R_4$ and $R_5$ are the same as described with respect to graphic formula III, and $R_8$ is selected from the group consisting of halogen, e.g., chloro, fluoro, or bromo, $C_1$–$C_4$ alkyl, e.g., $C_1$–$C_2$ alkyl, $C_1$–$C_5$ alkoxy, e.g., $C_1$–$C_2$ alkoxy, nitro, cyano, thiocyano, $C_1$–$C_4$ monohaloalkyl, e.g., chloromethyl and chloroethyl, $C_1$–$C_2$ polyhaloalkyl, e.g., trihaloalkyl, such as trifluoromethyl and 1,1,1-trifluoroethyl, and mono-, di- or trialkylamino wherein the alkyl moiety of the alkylamino group contains from 1 to 4 carbon atoms, e.g., methylamino, dimethylamino, diethylamino, trimethylamino and triethylamino. The letter "e" in formula VII is a number from 1 to 4, usually 1to 3, more usually 1 to 2.

When "e" is 1, the $R_8$ substituents may be located on any of the available carbon atoms of the benzene ring of the benzoxazine moiety, i.e., at the 5, 6, 7 or 8 positions. Preferably, the $R_8$ substituent is located on the 5, 6, or 7 carbon atoms. When "e" is 2 or more, the $R_8$ substituents may be the same or different and in either case are selected from the above-described group. When "e" is 2, the $R_8$ substituents may be located at the b 5 and 7 or 6 and 8 positions.

Examples of spiro(indoline) benzoxazines within the scope of graphic formula VII are listed in Table III. Compound 1 may be named: 7-methoxy-1',3', 3',4'(and 6'), 5'-pentamethylspiro[2H-1,4-benzoxazine-2,2'-indoline]. Compounds 2–48 may be similarly named as substituted spiro(indoline) benzoxazines using the substituents described in Table V for such compounds. In naming the spiro(indoline)benzoxazines, the IUPAC rules of organic nomenclature have been used. The positions on the indoline portion of the molecule have been numbered counterclockwise starting with the nitrogen atom as number one (1), and are identified by a prime number, e.g., 3'. The positions on the benzoxazines portion of the molecule have been numbered clockwise starting with the oxygen atom as number one (1).

TABLE III

| Compound No. | $R_1$ | $R_2$ | $R_3$ | $R_4$ | $R_5$ | $R_8$ | $R_8$ |
|---|---|---|---|---|---|---|---|
| 1 | Me | Me | Me | 4(6)-Me | 5-Me | 7-OMe | — |
| 2 | Me | Me | Me | 4(6)-Me | 5-Me | 7-OMe | 5-OMe |
| 3 | Me | Me | Me | 5-OMe | — | 7-OMe | 5-OMe |
| 4 | Me | Me | Me | 4(6)-Me | 5-Me | 7-OMe | 5-Cl |
| 5 | Me | Me | Me | 4(6)-Me | 5-Me | 6-NO$_2$ | — |
| 6 | Me | Me | Me | 4(6)-Me | 5-Me | 6-Cl | — |
| 7 | Me | Me | Ph | — | — | 7-OMe | — |
| 8 | Me | Me | Et | — | — | 7-OMe | 5-OMe |
| 9 | n-Bu | Me | Me | — | — | 7-OMe | 5-OMe |
| 10 | Me | Cyclohexyl | — | — | — | 7-OMe | 5-OMe |
| 11 | Me | Me | Me | 5-OMe | — | 6-NO$_2$ | — |
| 12 | Me | Me | Me | 5-OMe | — | 6-NO$_2$ | 8-OMe |
| 13 | Et | Me | Me | 5-OMe | — | 6-NO$_2$ | 8-OMe |
| 14 | Me | Me | Et | 4(6)-Me | 5-Me | 6-NO$_2$ | 8-OMe |
| 15 | Me | Me | Ph | — | — | 6-NO$_2$ | 8-OMe |
| 16 | Me | Me | Me | 4(6)-Me | 5-Me | 8-NO$_2$ | 6-OMe |
| 17 | Me | Me | Me | — | — | 8-NO$_2$ | 6-OMe |
| 18 | Me | Me | Me | 5-OMe | — | 8-NO$_2$ | 6-OMe |
| 19 | Et | Me | Me | — | — | 7-OMe | 6-Br |
| 20 | Me | Me | Et | 4(6)-Me | 5-Me | 7-OMe | 5-Me |
| 21 | i-Pr | Me | Me | 5-OMe | — | 7-OMe | 5-OMe |
| 22 | Me | Me | Me | — | — | 7-NEt$_2$ | — |
| 23 | Benzyl | Me | Me | — | — | 7-NO$_2$ | — |
| 24 | Me | Me | Me | 4(6)-F | — | 7-OMe | 5-OMe |
| 25 | Me | Me | Me | 6-Cl | — | 7-OMe | 5-OMe |
| 26 | Me | Me | Me | 7-F | — | 7-OMe | 5-OMe |
| 27 | Me | Me | Me | 7-Cl | — | 7-OMe | 5-OMe |
| 28 | Me | Me | Me | 7-Br | — | 7-OMe | 5-OMe |
| 29 | Me | Me | Me | 5-F | — | 7-OMe | 5-OMe |
| 30 | Me | Me | Me | 5-Cl | — | 7-OMe | 5-OMe |
| 31 | Me | Me | Me | 5-OMe | — | 7-OMe | 5-OMe |
| 32 | Me | Me | Me | 5-OMe | — | 7-OMe | — |
| 33 | Me | Me | Me | 6-CF$_3$ | — | 7-OMe | 5-OMe |
| 34 | Me | Me | Et | 4(6)-F | — | 7-OMe | 5-OMe |
| 35 | Me | Me | Me | 4(6)AcO | — | 7-OMe | 5-OMe |

TABLE III-continued

| Compound No. | R₁ | R₂ | R₃ | R₄ | R₅ | R₈ | R₈ |
|---|---|---|---|---|---|---|---|
| 36 | Me | Me | Me | 4(6)CF₃ | — | 7-OMe | 5-OMe |
| 37 | Me | Me | Me | 4(6)F | 5-F | 7-OMe | 5-OMe |
| 38 | Me | Me | Me | 4(6)Cl | 5-Cl | 7-OMe | 5-OMe |
| 39 | Me | Me | Me | 4(6)F | — | 7-OMe | 5-Cl |
| 40 | Me | Me | Me | 4(6)F | — | 7-OMe | 5-F |
| 41 | Me | Me | Me | 4(6)AcO | — | 7-OMe | 5-OMe |
| 42 | Me | Me | Me | — | 5-AcO | 7-OMe | 5-OMe |
| 43 | Me | Me | Me | 4(6)AcO | 5-F | 7-OMe | 5-OMe |
| 44 | Me | Me | Me | 4(6)AcO | 5-Cl | 7-OMe | 5-OMe |
| 45 | CNPr | Me | Me | — | — | 7-OMe | — |
| 46 | C(O)OEt | Me | Me | — | — | 7-OMe | 5-OMe |
| 47 | (EtO)₂Me | Me | Me | — | — | 7-OMe | — |
| 48 | HOEt | Me | Me | — | — | 7-OMe | — |

Key:
Me = methyl
n-Bu = n-butyl
Et = ethyl
i-Pr = isopropyl
CNPr = γ cyanoisopropyl
(EtO)₂Me = CH₃OCH₂CH₂OCH₂CH₂—
Ph = phenyl
OME = methoxy
NO₂ = nitro
NEt₂ = diethylamino
C(O)OEt = β-carboxyethyl
Br = bromine
Cl = chlorine
F = fluorine
AcO = acetoxy
HOEt = hydroxyethyl Spiro(indoline) benzoxaines may be synthesized by reaction of the corresponding R₈-substituted nitrosophenol compound with the corresponding R₄-and/or R₅-substituted indoline (Fishcer's base) or indolium salt, e.g., the iodide salt, compound. The two precursor materials are reacted in substantially stoichiometric amounts in a suitable solvent, such as toluene or ethanol, containing a base, such as triethylamine or piperidine, at temperatures of from about 40°C. to about 120° C. or 140° C. until the reaction is completed.

Any common organic solvent (polar and non-polar) except for aliphatic hydrocarbon solvents, such as hexane, may be used as the reaction medium. Suitable solvents include alcohols such as C₁–C₄ alkanols, e.g., methanol, ethanol, isopropanol, and the butanols; aromatic solvents such as benzene, toluene and xylene; ketones such as acetone, methyl ethyl ketone and methyl isobutyl ketone esters such as ethyl acetate; chlorinated lower aliphatic hydrocarbons such as methylene chloride and chloroform; dimethylsufoxide, dimethylformamide and tetrahydrofuran.

While reaction temperatures below 40° C. may be used, the reaction rate is very slow and commercially unacceptable. Reaction temperatures above 120° C. may cause decomposition of the product. Hence, temperatures of from 40° C. to 120° C., e.g., 50° C. to 100° C. are contemplated. STirring of the reaction medium at elevated reaction temperatures within the aforesaid ranges is recommended to prevent decomposition of the benzoxazine product.

Any organic or inorganic base may be used to react with the hydrogen halide that are liberated during the reaction as a result of using the indolium halide salt. Amines such as trimethylamine, triethylamine, diisopropylamine, piperidine, pyridine and piperazine may be used. Inorganic basic reagents such as sodium carbonate, sodium bicarbonate, potassium hydroxide, sodium hydroxide and sodium acetate may be used. The use of inorganic reagents will entail a two-phase reaction medium, i.e., an inorganic and organic phase. The basic reagent is commonly used in a stoichiometric excess, although stoichiometric amounts may be used.

Spiro(benzindoline) pyrido benzoxazines and spiro(benzindoline) naphthoxazine photochromic compounds may be represented by the following graphic formula VIII,

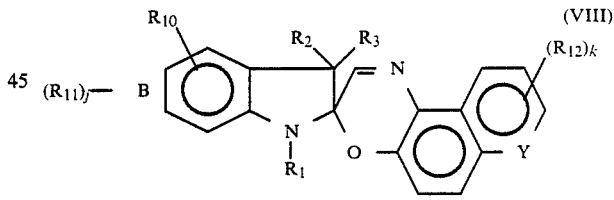

(VIII)

Ring B represents a substituted or unsubstituted benzene ring fused to the six membered ring of the indoline portion of the depicted formula. Ring B may be fused at the e, f, or g face of the indoline portion of the compound. Preferably, ring B is fused at the e or g face, as represented respectively by graphic formulae VIIIA and VIIIB:

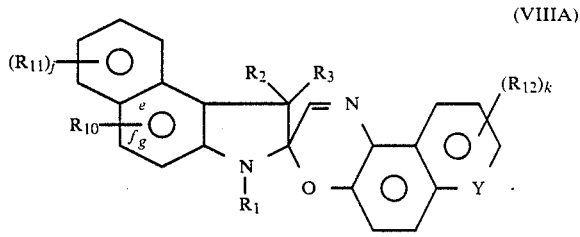

(VIIIA)

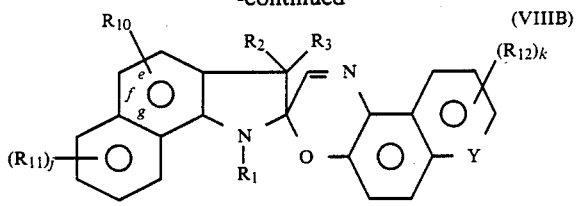

(VIIIB)

In the above graphic formulae, Y is carbon or nitrogen, and $R_1$, $R_2$ and $R_3$ are the same as described with respect to graphic formula III.

When Y is carbon and the $R_{12}$ substituent(s) is other than hydrogen, each $R_{12}$ substituent in graphic formula VIII may be selected from the group consisting of halogen, e.g., chloro, fluoro or bromo, $C_1$-$C_5$ alkyl, $C_1$-$C_5$ alkoxy, e.g., methoxy, ethoxy, propoxy, butoxy and pentoxy, nitro, cyano, thiocyano, $C_1$-$C_4$ monohaloalkyl, e.g., $C_1$-$C_4$ monochloroalkyl such as chloromethyl and chloroethyl, $C_1$-$C_2$ polyhaloalkyl, as for example triahloalkyl such as trichloro- or trifluoroalkyl, e.g., trifluoromethyl and 1,1,1-trifluoroethyl, and mono-or dialkylamino wherein the alkyl moiety of the alkylamino group contains from 1 to 4 carbon atoms, e.g., methylamino, ethylamino, propylamino, dimethylamino and diethylamino. The letter "k" in formula VIII is a number of from 0 to 2, e.g., 1 and denotes the number of non-hydrogen substituents. In particular, each $R_{12}$ substituent may be selected from the group $C_1$-$C_2$ alkyl, $C_1$-$C_2$ alkoxy, chloro, fluoro, bromo, nitro, and trifluoromethyl when e is 1 or 2.

When Y is carbon and "k" is 1, the $R_{12}$ substituent may be located on any of the available carbon atoms of the naphtho moiety of the naphthoxazine portion of the compound, i.e., at the 5', 6', 7', 8', 9'or 10' positions. Preferably, the $R_{12}$ substituent is present on the 7', 8' or 9' carbon atoms. When "k" is 2, the $R_{12}$ substituents may be the same or different and, in either case, are selected from the above-described group. When "k" is 2, the $R_{12}$ substituents are commonly located at the 7'0 and 9' or 8' and 10' positions.

When Y is nitrogen and the R substituent(s) is other than hydrogen, each $R_{12}$ substituent may be selected from $C_1$-$C_5$ alkyl, e.g., $C_1$-$C_2$ alkyl, $C_1$-$C_5$ alkoxy, e.g., $C_1$-$C_2$ alkoxy, and halogen, e.g., chloro, fluoro or bromo. Typically, k is 0 (zero) when Y is nitrogen and thus there are no non-hydrogen substituents. When "k" is 1 and Y is nitrogen, the R12 substituent may be located on any of the available carbon atoms of the pyridobenz moiety of the pyridobenzoxazine portion of the compound, i.e., at the 5', 6', 8', 9' or 10' positions, more usually at the 8', 9' or 10' positions. When "k" is 2, the $R_{12}$ substituent may be the same or different and, in either case, are selected from the above-described group and are located at two of aforedescribed available carbon atoms.

$R_{10}$ in graphic formula VIII is selected from the group consisting of hydrogen, halogen, e.g., chloro, fluoro or bromo, $C_1$-$C_5$ alkyl, e.g., $C_1$-$C_2$ alkyl, $C_1$-$C_5$ alkoxy, e.g., $C_1$-$C_2$ alkoxy, $C_1$-$C_4$ monohaloalkyl, e.g., $C_1$-$C_2$ monohaloalkyl such as chloromethyl, chloroethyl and fluoromethyl, $C_1$-$C_2$ polyhaloalkyl, as for example trihaloalkyl such as trichloro- or trifluoroalkyl, e.g., trifluoromethyl, cyano and $C_1$-$C_8$ alkoxycarbonyl. The $R_{10}$ substituent may be located at either the number 4 or 5 carbon atom positions.

$R_{11}$ in graphic formula VIII is selected from the group consisting of halogen, e.g., chloro, fluoro or bromo, $C_1$-$C_5$ alkyl, e.g., $C_1$-$C_2$ alkyl, $C_1$-$C_5$ alkoxy, e.g.. $C_1$-$C_2$ alkoxy, cyano, $C_1$-$C_8$ alkoxycarbonyl, $C_1$-$C_2$ polyhaloalkyl, $C_1$-$C_4$ monohaloalkyl and mono- or di-alkylamino wherein the alkyl moiety of the alkylamino group contains from 1 to 4 carbon atoms, e.g., methylamino, ethylamino, propylamino and diethylamino.

The letter "j" in formula VIII is a number of from 0 to 2, e.g., 0 or 1, more typically 0. When there are substituents on the benz moiety of the benzindoline portion of the compound and the letter "j" is 1 or 2, it denotes the number of non-hydrogen substituents. When "j" is 1, the $R_{11}$ substituent may be located at the number 6, 7 or 8 carbon atoms. Similarly, when "j" is 2, the $R_{11}$ substituents may be present at the 6 and 7, 6 and 8, or 7 and 8 carbon atoms.

Of particular interest, are photochromic materials represented by graphic formulae VIIIA and VIIIB wherein Y is N; $R_1$ is a $C_1$-$C_4$ alkyl, such as methyl, ethyl, n-propyl, isopropyl, n-butyl, secondary butyl, isobutyl and tertiary butyl; $R_2$ and $R_3$ are each methyl, ethyl or phenyl; $R_{12}$ is selected from $C_1$-$C_4$ alkyl, $C_1$-$C_4$ alkoxy, chloro, fluoro or cyano; $R_{10}$ is selected from hydrogen, fluoro, trifluoromethyl and $C_1$-$C_4$ alkyl; $R_{11}$ is selected from $C_1$-$C_4$ alkyl, $C_1$-$C_4$ alkoxy, chloro, fluoro and $C_1$-$C_4$ mono- or di-alkylamino; "j" is 0 or 1; and "k" is 0 or 1.

Examples of spiro(benzinoline)-type compounds within the scope of graphic formulae VIII are listed in Tables IV and V. In Table IV, Y is carbon. In Table V, Y is nitrogen. Compound 1 of Table IV may be named: 9'-methoxy-1,3,3-trimethylspiro [benz[e]indoline-2,3'[3H]naphth [2,1-b][1,4]oxazine]. Usually, the R12 substituent (when "k" is 1) will be located at the 8' or 9' carbon atom, more usually at the 9' carbon atom. When 'k' is 2 and Y is carbon, the R12 substituents will usually be located at the 7' and 9' carbon atoms. For example, in Table IV, the recited methoxy (OMe) and ethoxy (OEt) substituents will commonly be a 9'-methoxy or 9'-ethoxy substituent. The dimethoxy substituents of compound 13 will commonly be 7',9'-dimethoxy substituents. The bromo substituent of compound 25 may be an 8'-bromo substituent. Compounds in Tables IV and V may be similarly named as substituted spiro benz(indoline) naphthoxazines or spiro benz(indoline) pyrido benzoxazines using the substituents described in the Tables for such compounds. In naming compounds herein, the IUPAC rules of organic nomenclature have been used.

TABLE IV

| Compound No. | SUBSTITUENT (Y = C) | | | | | |
| --- | --- | --- | --- | --- | --- | --- |
| | $R_1$ | $R_2$ | $R_3$ | $R_{12}$ | $R_{10}$ | $R_{11}$ | Face |
| 1 | Me | Me | Me | OMe | H | — | e |
| 2 | Me | Me | Me | OMe | H | — | g |
| 3 | Et | Me | Me | OMe | H | — | e |
| 4 | n-Pr | Me | Me | OMe | H | — | e |
| 5 | i-Pr | Me | Me | OMe | H | — | e |

TABLE IV-continued
SUBSTITUENT (Y = C)

| Compound No. | R₁ | R₂ | R₃ | R₁₂ | R₁₀ | R₁₁ | Face |
|---|---|---|---|---|---|---|---|
| 6 | Et | Me | Me | OMe | H | — | g |
| 7 | n-Pr | Me | Me | OMe | H | — | g |
| 8 | Me | Me | Me | OMe | F | — | e |
| 9 | Me | Me | Me | OMe | CF₃ | — | e |
| 10 | Me | Me | Me | OMe | F | — | g |
| 11 | Me | Me | Me | OMe | CF₃ | — | g |
| 12 | Me | Me | Ph | OMe | H | Cl | g |
| 13 | Me | Me | Me | (OMe)₂ | OMe | — | g |
| 14 | Et | Me | Me | NEt₂ | H | OMe | e |
| 15 | Me | Me | Me | OMe | Me | Me | g |
| 16 | Me | Me | Me | Me | Me | Me | e |
| 17 | Me | Me | Me | NO₂ | CF₃ | — | g |
| 18 | Me | Me | Me | Cl | H | — | e |
| 19 | i-Pr | Me | Me | CF₃ | H | — | e |
| 20 | Me | Me | Me | ClMe | CF₃ | — | g |
| 21 | Me | Me | Me | OMe | AcO | — | g |
| 22 | Me | Me | Me | OMe | ClMe | Cl | e |
| 23 | Me | Me | Me | — | H | — | e or g |
| 24 | Me | Me | Me | OEt | H | — | e or g |
| 25 | Me | Me | Me | Br | H | — | e or g |
| 26 | (CH₂)₃CN | Me | Me | OMe | H | — | e or g |
| 27 | (CH₂)COOH | Me | Me | OMe | H | — | e or g |
| 28 | (CH₂)₂OH | Me | Me | OMe | H | — | e or g |

TABLE V
SUBSTITUENT (Y = N)

| Compound No. | R₁ | R₂ | R₃ | R₁₂ | R₁₀ | R₁₁ | Face |
|---|---|---|---|---|---|---|---|
| 1 | Me | Me | Me | H | H | — | e |
| 2 | Me | Me | Me | H | H | — | g |
| 3 | Me | Me | Me | Me | H | — | e or g |
| 4 | Me | Me | Me | OMe | H | — | e or g |
| 5 | Me | Me | Me | Cl | H | — | e or g |
| 6 | Me | Me | Me | — | F | — | e or g |
| 7 | Me | Me | Me | — | CF₃ | — | e or g |
| 8 | Et | Me | Me | — | H | — | e or g |
| 9 | n-Pr | Me | Me | — | H | — | e or g |
| 10 | i-Pr | Me | Me | — | H | — | e |
| 11 | Me | Me | Et | Me | CF₃ | F | g |
| 12 | Me | Me | Me | OMe | Me | Me | g |
| 13 | Me | Me | Et | OMe | H | OMe | g |
| 14 | Me | Me | Me | OMe | F | NEt₂ | g |
| 15 | Me | Me | Et | F | F | Me | g |
| 16 | Me | Me | Me | Me | H | — | e or g |
| 17 | (CH₂)₃CN | Me | Me | — | H | — | e or g |
| 18 | (CH₂)₂COOH | Me | Me | — | H | — | e or g |
| 19 | (CH₂)₂OH | Me | Me | — | H | — | e or g |
| 20 | Me | Me | Me | — | H | CF₃ | e or g |
| 21 | Me | Me | Me | — | H | F | e or g |

Key For Tables:
Me = methyl
Et = ethyl
n-Pr = n-propyl
i-Pr = isopropyl
(CH₂)₃CN = cyanopropyl
(CH₂)₂COOH = carboxyethyl
A hyphen (-) denotes the absence of non-hydrogen substituents
Ph = phenyl
OMe = methoxy
NO₂ = nitro
NEt₂ = diethylamino
(CH₂)₂OH = hydroxyethyl
CF₃ = trifluoromethyl
ClMe = chloromethyl
Cl = chlorine
F = fluorine
AcO = acetoxy The photochromic materials of the present invention may be synthesized by reaction of the corresponding $R_{10}$ and $(R_{11})_j$-substituted indoline (Fischer's base) or indolium salt, e.g. the iodide salt, with the corresponding $(R_{12})_k$-substituted-1-nitroso-2-naphthol or $(R_{12})_k$-substituted -5-nitroso-6-quinolinol.

The two precursor materials are reacted in substantially stoichiometric amounts in a suitable solvent, such as toluene or ethanol, containing a base, such as triethylamine or piperidine, (when the indolium salt is used) at temperatures of from about 40° C. to about 140° C., more usually from 40° C. to 120° C., until the reaction is completed.

Photochromic organometal dithizonates, i.e., (arylazo) thioformic arylhydrazidates, may be used as the photochromic substance to prepare the photochromic pigment described herein. Typically, such substances are mercury dithizonates, but may be represented by the following graphic formula:

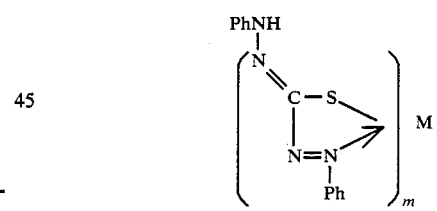

wherein M is mercury, palladium, platinum, nickel, silver, zinc, cadmium, bismuth and lead, m is a whole positive integer of from 1 to 3, e.g., 2, and Ph is phenyl or methyl substituted phenyl. Preferably M is mercury. See, for example, U.S. Pat. No. 3,361,706.

Examples of some common mercury dithizonates are: mercury bis (diphenylthiocarbazonate), diphenylthiocarbazonomercuric chloride, fluoride, iodide or bromide, dinaphthylthiocarbazonomercuric chloride, fluoride, iodide or bromide, ditolylthiocarbazonomercuric chloride or fluoride, mercury bis(dinaphthylthiocarbazonate), mercury bis(ditolylthiocarbazonate), ethylmercuric diphenylthiocarbazonate and phenylmercuric diphenylthiocarbazonate.

Spirodihydroindolizines are another known group of photochromic substances that have recently been developed by H. Durr. These substances may be represented by the following graphic formula:

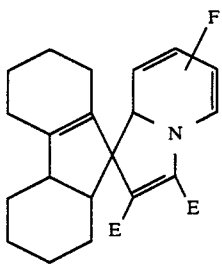

wherein E is hydrogen, C(O)R, OC(O)R, CN, or CF3 wherein R is a $C_1$–$C_4$ alkyl, and F may be a $C_1$–$C_4$ alkyl, $C_1$–$C_4$ alkoxy, di($C_1$–$C_2$) alkylamino, cyano, phenyl and C(O)R. See, for example, Germany Patents DE 3,320,077, 3,220257 and 2,906,193, which are incorporated herein by reference. Examples of such spirodihydroindolizines are:

2,3-Dicarbomethoxy-8a-methyl-spiro [1,5,6,8a-tetrahydropyrrolo-[1,2-a]-[3,4]-dihydroisoquinoline-1,9'-fluorene], 2,3-dicarbomethoxy-8a-phenyl-spiro [1,5,6,8a-tetrahydropyrrolo-[1,2-a]-[3,4]-dihydroisoquinoline-1,9'-fluorene]

2,3-dicarbomethoxy-8a-thiophene-9,10-dimethoxy-spiro[1,5,6,8a-tetrahydro-pyrrolo-[1,2-a]-[3,4]-dihydroisoquinoline-1,9'-fluorene], 2,3-dicyano-8a-phenyl-spiro[1,5,6,8a-tetrahydro-pyrrolo-[1,2-a]-[3,4]-dihydroisoquinoline-1,9'-fluorene], 2,3-dicyano-8a-methyl-spiro[1,5,6,8a-tetrahydro-pyrrolo-[1,2-a]-[3,4]-dihydroisoquinoline-1,9'-fluorene], 2,3-dicarbomethoxy-spiro[1,2,3,8a-tetrahydropyrrolo-[1,2-a]-isoquinoline-1,9'-fluorene], 2,3-dicarbomethoxy-spiro[1,7,8,8a-tetrahydropyrrolo-[1,2-a]-[3,4]-di-hydroquinoline-1,9'-fluorene], and 2,3-dicarbomethoxy-spiro [1,7,8,8a-tetrahydropyrrolo-[2,1-f]-[4,5]-di-hydropyridazine-1,9'-fluorene].

The fulgides and fulgimides represent a further group of photochromic compounds that may be used to prepare the organic photochromic pigment of the present invention. Examples include the -furyl and 3-thienyl fulgides and fulgimides described in U.S. Pat. No. 4,220,708, and the 3-pyrryl fulgides and fulgimides described in British Patent Application No. 2,170,202. Such patents are incorporated herein by reference.

Photochromic heterocyclic fulgides and fulgimides of U.S. 4,220,708 are represented by the following graphic formula,

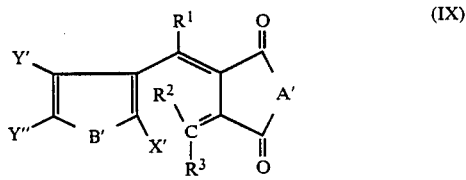

wherein $R^1$ represents a $C_1$–$C_4$ alkyl, phenyl, mono- and di($C_1$–$C_4$) alkyl substituted phenyl, e.g., tolyl, or phen ($C_1$–$C_4$) alkyl, e.g., benzyL group; A' represents oxygen or =N—$R^4$, in which $R^4$ is $C_1$–$C_4$ alkyl or phenyl, B represents oxygen or sulfur, $R^2$ and $R^3$ independently represent a $C_1$–$C_4$ alkyl, phenyl or phen($C_1$–$C_4$) alkyl or one of $R^2$ and $R^3$ is hydrogen and the other is one of the aforementioned groups, or $R^2R^3C$=represents an adamantylidene group, X' represents hydrogen or $R^1$ and Y' and Y''' are each selected from hydrogen, halogen, e.g., chloro, fluoro, bromo or iodo, $R^1$, $C_1$–$C_4$ alkoxy, e.g., methoxy, and phenoxy. Examples of such compounds include: (Z)-α-2,5-dimethyl-3-furylethylidene (isopropylidene) succinic anhydride, (Z)-α-2-benzyl-3-benzfurylethylidene (isopropylidene) succinic anhydride, (Z)-α-2,5-dimethyl-3-thienylethylidene (isoproylidene) succinic anhydride, (E)-α-2-methyl-3-furylethylidene-(isopropylidene) succinic anhydride, (Z)-α-2,5-diphenyl-3-furylethylidene(isopropylidene) succinic anhydride, 2,5-dimethyl-3-furyl(3',5'-dimethoxyphenyl)methylene-E-benzylidene succinic anhydride, and adamant-2-ylidene-(2',5'-dimethyl-3'furyl) ethylidene succinic anhydride.

Photochromic heterocyclic fulgides and fulgimides of British Patent No. 2,170,202 may be represented by the following graphic formula,

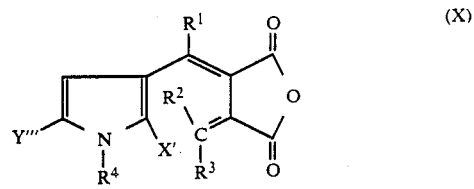

wherein $R^1$, $R^2$, $R^3$ and X' are described with respect to formula IX, $R^4$=$R^1$, and Y''' is a $C_1$–$C_4$ alkyl phenyl, or phen ($C_1$–$C_4$) alkyl group. Examples of compounds represented by formula X include:

(E)-α-(1,2,5-trimethyl-3-pyrryl)ethylidene (isopropylidene) succinic anhydride, (E)-α-(2,5-dimethyl-1-phenyl-3-pyrryl) ethylidene (isopropylidene) succinic anhydride, (E)-α-(2,5-dimethyl-1-p-tolyl-3-pyrrl) ethylidene (isopropylidene) succinic anhydride, (E)-α-(1,5-diphenyl-2-methyl-3-pyrryl) ethylidene (isopropylidene) succinic anhydride, and (E)-α-(2,5-dimethyl-1-phenyl-3-pyrryl) ethylidene (dicyclopropylmethylene) succinic anhydride.

The organic photochromic pigment prepared in accordance with the present invention is a fine powder which may be incorporated into any suitable vehicle that is transparent to ultraviolet light or used in any application where pigmentary materials are utilized. For example, the aforesaid pigment can be incorporated into paints, inks, coating compositions, adhesives and admixed with other polymeric materials and formed into various shapes by, for example, casting and injection molding. The host (carrier) in which the pigment is housed must be transparent to visible light including ultraviolet light to allow activation of the pigment. The photochromic pigment may be used also as an additive to polymerizable monomeric compositions, which when polymerized produce a polymerizate containing a homogenous dispersion of the pigment throughout the polymer.

The present process is more particularly described in the following examples which are intended as illustrative only, since numerous modifications and variations therein will be apparent to those skilled in the art.

EXAMPLE 1

Twenty grams of ethylene glycol dimethacrylate and 0.01 grams of 1,3,3,4,5 (and 5,6) pentamethyl spiro[indoline]-2,3'[3H]pyrido [3,2-f][1,4].benzoxazine]were charged to a tared 50 milliliter (ml) beaker. The mixture was stirred to dissolve the spiro(indoline)pyridobenzoxazine and 0.108 parts (per hundred parts of monomer) of diisopropyl peroxydicarbonate added to the mixture, which was stirred and poured into a 4 inch ×4 inch ×1/16 inch (10.16 cm ×10.16 cm x 0.16 cm) sheet mold. After standing at room temperature overnight, the mold was place in a recirculating air oven maintained at 45° C. The mold was maintained at that temperature for 4 hours. Thereafter the oven temperature was increased to 50° C. and the mold maintained at that temperature for 18 hours. The resulting sheet was demolded. The sheet cracked during the demolding procedure. A portion of the cast sheet was ground into a fine powder using a mortar and pestle. Both the cast sheet and pigment powder exhibited a color change, i.e., a photochromic effect, when exposed to ultraviolet light.

The above procedure was repeated, except that the photochromic substance used was 1,3,3-trimethyl-5-methoxy-spiro[indoline]-2,3'[3H]pyrido [3,2-f][1,4]benzoxazine]. Similar results were obtained.

EXAMPLE 2

The procedure of Example 1 was repeated, except that 0.04 grams of 5,7-dimethoxy-1',3',3',4' (and 6'), 5''-pentamethylspiro[2H-1,4-benzoxazine-2,2'-indoline]- was used as photochromic substance. Results similar to that obtained in Example 1 were observed.

EXAMPLE 3

A tared 250 ml. beaker was charged with 115 grams of hexane diol diacrylate, 0.12 grams of the photochromic substance of Example 1, and 0.115 grams of diisopropyl peroxydicarbonate, and the mixture stirred for several minutes. 102.5 grams of the resultant reaction mixture was transferred to a 28 oz. Boston round bottle containing 300 ml. of an aqueous polymerization medium prepared by mixing 754.5 grams of distilled water, 3.7 grams of Acrysol ® ASE-95 polyacrylic acid, 5.0 grams of sodium bicarbonate and 0.19 grams of sodium hydroxide. The bottle was purged with argon for about 3 to 4 minutes, sealed, shaken vigorously and placed in a 45° C. temperature tumbling water bath for 18 hours. A pinkish polymer was recovered from the polymerization bottle by filtration, washed with distilled water and dried under vacuum at 40° C. for 18 hours. The resulting dried polymer powder was photochromic, i.e., it changed to a blue color when irradiated with ultraviolet light. The ultimate particle size of the powder appeared to be about 5±3 micrometers with the powder comprising agglomerates of 18-25 micrometers. A portion of the powder product was ground gently with a mortar and pestle to break-up the agglomerates and a portion of this ground product further ground in an oscillating grinder for 30 seconds three times, i.e., a total of 90 seconds grinding time. This powder was spread on a glass plate and exposed to ultraviolet light. It remained photochromic.

EXAMPLE 4

The general procedure of Example 3 was used to prepare a photochromic polymer of ethylene glycol dimethacrylate. 100 grams of the monomer was mixed with 0.2 grams of the photochromic substance of Example 1 and 0.25 grams (0.05 phm) of diisopropyl peroxydicarbonate. The resultant mixture was added to 300 ml of an aqueous polymerization medium prepared from 765 grams of distilled water, 3.83 grams of sodium lauryl sulfate, 9.56 grams of Acrysol ® ASE-95 poly- acrylic acid, 3.06 grams of sodium bicarbonate and 0.55 grams of sodium hydroxide. Polymerization was conducted overnight at 45° C. The polymer product was recovered by filtration, the filter cake broken-up with a mortar and pestle, this ground product washed with methanol and dried to a free flowing powder. The dried powder was photochromic. 25 grams of the dried powder was ground in an oscillating grinder for 1 minute. The average particle size was found to be about 23 micrometers. After grinding for 12 hours in a ball mill, the average particle size had been reduced to 8 micrometers.

EXAMPLE 5

A polymerizable mixture was prepared by combining 334.61 grams of diethylene glycol dimethacrylate, 165.39 grams of trimethylol propane trimethacrylate, 2.50 grams of the photochromic substance of Example 1 and 0.497 grams of diisopropyl peroxydicarbonate. Three 12 inch x 12 inch ×1/16 inch (30.5 cm ×30.5 cm ×0.16 cm) molds were filled with the mixture; the filled molds were left overnight at room temperature and then placed in an oven for 16 hours at 45° C. Thereafter, the oven temperature was increased to 100° C. over 3 hours and maintained at 100° C. for 1 hour. The cured sheets were allowed to cool and then removed from the molds. The polymer sheets fractured on cooling. The fractured sheets were broken into smaller pieces and ball milled to an average particle size of 0.6 micrometers. The resultant powder product was photochromic.

While the above invention has been illustrated, particularly with spiro(indoline)-type photochromic substances, it expected that similar results will be obtained by substituting other photochromic materials. Similarly the use of polyfunctional acrylate monomers other than those specifically described in the examples are expected to provide similar results.

Although the present invention has been described with reference to the specific details of certain embodiments thereof, it is not intended that such detail should be regarded as limitations upon the scope of the invention, except as and to the extent that they are included in the accompanying claims.

We claim:

1. Photochromic particulate cross-linked thermostet resin having an average particle diameter between about 0.25 and 20 micrometers and having a photochromic amount of an organic photochromic substance uniformly dispersed throughout the particulate resin, said thermoset resin being a polymerizate of a polyfunctional acrylate monomer composition which is polymerized with a peroxygen or azo-type initiator in the presence of said photochromic substance, said polyfunctional acrylate monomer composition including at least one acrylate monomer represented by the following formula,

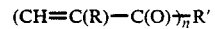

$(CH_2=C(R)-C(O))_{\overline{n}}R'$ wherein R is hydrogen or methyl, n is the number 2, 3 or 4 and R' is the multivalent radical remaining after removal of the hydroxy groups from a polyol having from 2 to 4 hydroxy groups.

2. The particulate thermoset resin of claim 1 wherein R' is selected from $C_2$-$C_8$ glycols, cyclohexane diol, diethylene glycol, triethylene glycol, tetraethylene glycol, dipropylene glycol, $C_2$-$C_5$ triols and pentaerythritol, and n is 2 or 3.

3. The particulate thermoset resin of claim 2 wherein the organic photochromic substance is selected from the group consisting of spiro(indoline)-type compounds, metal dithizonate compounds, fulgides, fulgimides, and spirodihydroindolizines.

4. The particulate thermoset resin of claim 3 wherein the spiro(indoline)-type compounds are selected from the group consisting of spiro(indoline) pyrido benzoxazines, spiro(indoline) naphthoxazines, spiro(benzindoline) pyrido benzoxazines, spiro(benzindoline) naphthoxazines, spiro(indoline) benzopyrans, spiro(indoline naphthopyrans, spiro(indoline) quinopyrans, spiro(indoline) benzoxazines and mixtures of such spiro(indoline) compounds.

5. The particulate thermoset resin of claim 1 wherein the polyfunctional acrylate monomer composition contains from about 1 to about 20 weight percent of monofunctional copolymerizable monomer selected from monofunctional acrylic and methacrylic esters and vinyl esters of $C_2$-$C_5$ carboxylic acids.

6. The particulate thermoset resin of claim 5 wherein the monofunctional acrylic esters are represented by the formula, $$CH_2=C(R)-C(O)-O-R''$$

wherein R is hydrogen or methyl and R' is selected from the group consisting of $C_1$-$C_{12}$ alkyl, $C_1$-$C_6$ cycloalkyl, glycidyl and hydroxyethyl.

7. The particulate thermoset resin of claim 3 wherein from about 0.01 to about 10 weight percent of the photochromic substance is present in the particulate resin.

8. A method for producing a photochromic particulate thermoset resin, which comprises dispersing a substantially uniform mixture of polyfunctional acrylate monomer composition and a photochromic amount of organic photochromic substance that is compatible with said monmer composition in an aqueous polymerization medium, polymerizing the monomer, with a peroxygen or azo-type initiator and separating finely-divided cross-linked thermoset photochromic particles from the polymerization medium, said polyfunctional acrylate monomer being represented by the following formula, $$(CH=C(R)-C(O))_{\overline{n}}R'$$

wherein R is hydrogen or methyl n is the number 2, 3 or 4 and R' is the multivalent radical remaining after removal of the hydroxy groups from a polyol having from 2 to 4 hydroxy groups.

9. The method of claim 8 wherein R' is selected from $C_2$-$C_8$ glycols, cyclohexane diol, diethylene glycol, triethylene glycol, tetraethylene glycol, dipropylene glycol, $C_2$-$C_5$ triols and pentaerythritol, and n is 2 or 3.

10. The method of claim 9 wherein the polyfunctional monomer polymerized contains from about 1 to about 20 weight percent of monofunctional copolymerizable monomer selected from monofunctional acrylic and methacrylic esters and vinyl esters of $C_2$-$C_5$ carboxylic acids.

11. The method of claim 10 wherein the monofunctional acrylic esters are represented by the formula, $$CH_2=C(R)-C(O)-O-R''$$

wherein R is hydrogen or methyl and R'' is selected from the group consisting of $C_1$-$C_{12}$ alkyl, $C_5$-$C_6$ cycloalkyl, glycidyl and hydroxyethyl.

12. The method of claim 8 wherein the organic photochromic substance is selected from the group consisting of spiro(indoline)-type compounds, metal dithizonate compounds, fulgides, fulgimides, and spirodihydroindolizines.

13. The method of claim 12 wherein the spiro(indoline)-type compounds are selected from the group consisting of spiro(indoline) pyrido benzoxazines, spiro(indoline) naphthoxazines, spiro(benzindoline) pyrido benzoxazines, spiro(benzindoline) naphthoxazines, spiro(indoline) benzopyrans, spiro(indoline naphthopyrans, spiro(indoline) quinopyrans, spiro(indoline) benzoxazines and mixtures of such spiro(indoline) compounds.

14. The method of claim 13 wherein the mixture of polyfunctional acrylate monomer and photochromic substance contains from 0.01 to 10 weight percent of the photochromic substance.

15. The method of claim 14 wherein polymerization of the monomer is by emulsion polymerization.

16. The method of claim 8 wherein the finely-divided thermoset photochromic particle separated from the polymerization medium are milled to produce a product with average particle size reduced from that originally obtained.

* * * * *